May 13, 1969  S. A. STEWART  3,443,984
METHOD OF COATING TUBULAR OBJECT WITH POLYURETHANE FOAM
Filed March 27, 1964
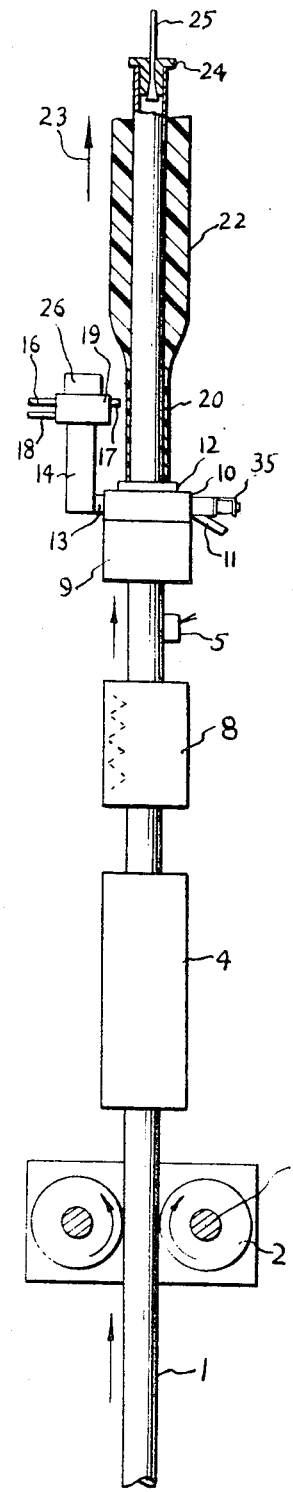
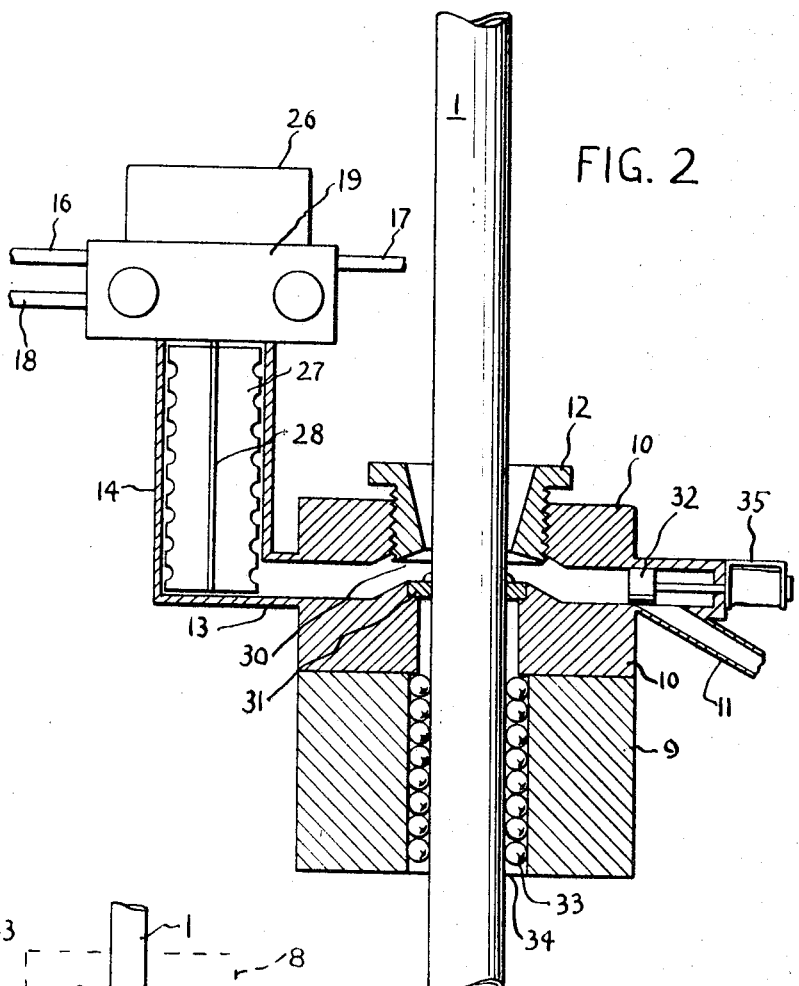
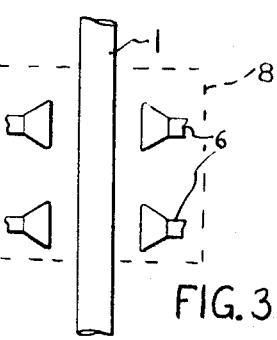
FIG. 1
FIG. 2
FIG. 3
INVENTOR.
SHERMAN ALAN STEWART
BY
HIS ATTORNEY

United States Patent Office 3,443,984
Patented May 13, 1969

3,443,984
METHOD OF COATING TUBULAR OBJECT WITH POLYURETHANE FOAM
Sherman Alan Stewart, Louisville, Ky., assignor to The Martin Sweets Company, Inc., Louisville, Ky., a corporation of Kentucky
Filed Mar. 27, 1964, Ser. No. 355,293
Int. Cl. B44d 1/36; F16l 9/14
U.S. Cl. 117—94      6 Claims

ABSTRACT OF THE DISCLOSURE

Discloses a process for dispensing a foamable mixture of polyurethane onto a moving elongated tubular object, so as to form, in situ, a concentric foam layer of uniform thickness for insulation or other purposes. The tubular member or pipe is moved through a low pressure dispensing head in true vertical orientation, to prevent slumping, and the foamable mixture is flowed onto the surface of the pipe to wet same and thereafter is foamed and cured.

---

This invention relates to a process for dispensing a foamable plastic material in a fluid stage onto an elongated moving substrate. More specifically, this invention relates to a process and means to coat a tubular member with a foamable plastic insulating material.

Polyurethane, or simply urethane resins, are a comparatively recent entry in the field of plastics. A variety of compounds containing one or more active hydrogen groups, e.g., hydroxyl, amine, and carboxyl, may be used to react with the isocyanate to produce polymers. Polyurethane foams are cellular materials prepared by the reaction of a polyisocyanate with a polyester polyol or a polyether polyol to form a polymer while simultaneously releasing or generating a gaseous blowing agent internally in the fluid mixture. The gaseous blowing agent forms the cells and the polymer forms the cell walls. Other additives may be used in order to change or enhance some of the properties desired in the final product. A significant feature of this type of reaction is the reaction of the polyisocyanate and water to liberate carbon dioxide which occurs simultaneously with polymerization and cross linking reactions of the other components to entrap the liberated carbon dioxide. Alternately or additionally, blowing agents may be added to one or more of the components to increase the number of gas cells in the resulting foam. Most of the volatile blowing agents used are handled below their boiling points. Thus, the exothermic reaction volatilizes the blowing agent to form the cells in the resulting polymer. In some instances, the blowing agents are added to one of the chemical components under pressure. This technique is referred to as "frothing" in the art. It should be understood that the gaseous blowing agent might result from the reaction of stoichiometric amounts of water and polyisocyanate or from the volatilization of a low temperature boiling solvent dissolved in one of the components. The merits of the polyurethane foams are numerous in that they can be foamed in place and are self-curing due to the exothermic heat reaction generated in the foaming reaction. They can be formulated to have a wide range of physical properties and densities ranging from 0.5 to 70.00 pounds per cubic foot and can be made fire resistant enough so that they will not sustain combustion. The three general foam classifications are flexible, semirigid, and rigid, each of which is produced by the particular formulation of components. These materials are widely used as insulation having a K factor (measure of thermo-conductivity) as low as .10 at 70° F., as compared to the K factor of glass fiber insulation at .26. Unprotected urethane foam is generally assigned an "aged" value of .15. Under the same conditions, unprotected fiber glass may achieve a value of .5 or higher due to the unimpeded penetration of highly conductive atmospheric moisture.

Heretofore, such products have been produced in the industry by forming blankets of foam by such techniques as spraying, dipping, roller coating, doctor blading, or sandwich calendering of the foam onto a substrate. All of these techniques present problems either of an excess of plastic so as to produce irregular surfaces or high losses or because of the handling pot life of the coating material as is encountered in the dipping, roller coating, and similar techniques. Other difficulties encountered are those of irregular coating thickness and excessively precise machinery tolerances.

With these techniques, a blanket of material is formed which, if it is to be used for insulation, must then be placed onto the pipe or duct work manually and adhesively sealed in place. The spray technique can be applied in place but tends to produce irregular surfaces and high losses. This is particularly true with low diameter tubes or pipes. In one technique developed in Norway, which is described in the March 1962 issue of Modern Plastics, p. 106 et seq., a technique is described which comprises applyig a foamable polyurethane mixture onto a revolving mandrel containing a paper or similar substrate by the use of a longitudinally moving mixing head. This technique involves the subsequent slitting of the plastic and substrate to remove same from the mandrel after the polyurethane foam is cured.

The present invention relates to a method and means for flowing foamable polyurethane mixture directly onto the surface which is to be insulated. This is accomplished by moving the member to be insulated as, for example, a copper tube, through a dispensing unit which conforms to the surface of the tube. The tube is pulled through the unit vertically so that the mixture wets the surface at a uniform rate thereby producing a uniform coating which is foamed and cured to produce a uniform foam insulation of predetermined thickness. The invention utilizes a metering device capable of metering two or more materials simultaneously at a controlled flow rate, a mixing device capable of mixing two or more fluid streams simultaneously into a uniform and homogenous fluid which is then conveyed through appropriate passageways to a dispensing unit which allows the material to flow onto the moving substrate at a rate determined by the flow rate of the mixed materials, the rate of movement of the substrate, and the thickness as determined by the viscosity of the mixed materials. This process depends on true vertical orientation of the substrate. This is for the reason that some "slumping" occurs. The amount of slumping is due to the effect of the original viscosity, the change in viscosity due to polymerization, the change in viscosity due to the temperature of the substrate and the effects of gravity. Thus, when tubular members are coated concentricity is dependent on the substrate being vertical with respect to gravity. The process takes advantage of the unique adhesive properties of the urethane foam and of the unique "pour in place" versatility of urethane foam.

Almost any rigid or flexible foam formulations can be adapted to achieve the desired result by a person schooled in the urethane foam processing art. The process depends on the use of a multi-component flexible or rigid urethane foam formulation. The working or "pot life" can vary from as low as $\frac{1}{10}$ of a second to as much as 15 minutes and still work. Ideally, however, the pot life is between $\frac{1}{10}$ and 10 seconds for most efficient operation. The process can be operated either continuously or intermittently so that the insulated tubing or other elongated member can be made in continuous lengths and placed on a reel or cut into shorter lengths such as 10 or 20 feet.

The invention will be better understood by reference to the attached drawings and the detailed description in which:

FIG. 1 is a schematic view of the process utilizing a tubular pipe as the substrate to be coated.

FIG. 2 is a fragmentary view partially in section illustrating the relation of the mixing head to the dispensing unit and the tubular substrate.

FIG. 3 is a fragmentary elevation illustrating diagrammatically a specific embodiment of the temperature control zone.

Referring now to the drawings, pipe 1 is driven by driving means 2 which comprises large rollers of rubber or other materials mounted on shaft 3. Additionally, or alternately, the pipe may be lifted by means of clamp 24 and cable 25 attached to lifting means not shown. The pipe is drawn through a degreasing and cleaning zone where it may be treated with cleaning solutions such as benzol or benzene or solutions of quaternary ammonia compounds to remove any grease or other material from the pipe. From there, the pipe is drawn through a temperature control zone 8. This may comprise a collar for inducing current through the pipe to heat same by resistance. The current may be supplied through lines not shown and connected to sensing element 5 to maintain same at a desired temperature as is well known in the art. Radiant heating, as, for example, by lamps 6 (see FIG. 3), may be used to control the temperature. Alternately, the temperature control zone 8 may comprise a tunnel through which hot air blasts are circulated for heating or through which cold air blasts may be used for chilling by methods well known in the art. The pipe is then drawn through guide means 9 which maintains same in true vertical orientation relative to gravity. Guide means 9 is equipped with a series of ball bearings 33 dispensed in raceway 34. Directly above guide means 9 is located the dispensing unit housing 10 which completely surrounds the pipe 1. Threadably engaged in the top of the housing 10 is collar member 12 which may be rotated to change the restrictive annular orifice 30 surrounding the pipe. At the bottom portion of the housing 10 is a plastic or elastomer seal 31 which prevents the coating material from running down into the pipe and into the bearings of guide means 9. The plastic coating 20 is uniformly flowed onto the substrate 1 and foams to form a foam insulation 22. The direction of travel of the pipe is illustrated by arrow 23.

The dispensing unit 10 is connected by conduit 13 to the mixing head 14 which is of standard construction consisting of a spiral pumping type impeller 27 driven by shaft 28 by means of motor 26. The liquid components are brought into a valve section 19 through inlet lines 16, 17 and 18, preferably of the type disclosed and claimed by George F. Spragens in U.S. Patent 3,098,506, which is owned by the assignee of this application. For purposes of illustration, lines 16 and 17 may be utilized for metering two components of a two component system into the valve section of the mixing head and line 18 may be utilized to inject solvent into the mixing head and throughout the system when the system is not in use. A plug valve 32 controlled by solenoid 35 is supplied adjacent to exhaust pipe 11 to allow the system to be flushed with solvent to clear the system of the foamable mixture after use.

As previously indicated, many rigid or flexible polyurethane foam formulations can be adapted to achieve the desired result and the following specific examples are given to indicate formulations which are operative in the process of this invention. In the following examples the formulations are adapted for coating a 0.5 inch O.D. pipe or tubing with an insulation having a final radial thickness of .5 inch±⅟₁₆ of an inch. To achieve this result, the speed of the tubing past the dispensing zone 10 is 100 feet per minute. The total flow rate of the mixed chemicals equals 920 grams per minute.

EXAMPLE 1

To produce a two component one-shot rigid urethane foam, the following components are mixed in a mixing head and fed to the dispensing zone at the rate of 920 grams per minute:

| Component A: | Parts by weight |
|---|---|
| Polyol (polyether type, approx. 460–490 hydroxyl No.) | 100.0 |
| Additive (for extra strength) N,N,N¹,N¹, tetrakis (2 hydroxyl propyl) ethylene diamine | 8.0 |
| Triethylene diamine (catalyst) | 0.5 |
| N,N-dimethyl ethanolamine (catalyst-emulsifier) | 0.5 |
| Dibutyl tin dilaurate | 0.04 |
| Silicone surfactant | 1.5 |
| Trichlorofluoromethane blowing agent | 38.0 |

| Component B: | |
|---|---|
| "Crude" or "unrefined" di-isocyanate (approximately 103 index) | 107.0 |

Component A is fed into the mixing head at a temperature of about 70° F. and Component B is fed into the mixing head at approximately 90° F. The pipe 1 is maintained at a temperature of 130° F.±10°. The resulting mixture has a cream time of about 2 seconds. The cream time is the time in which the gases begin to form within the mixture to the extent that the clear liquid becomes an opaque or cream-like color. This material rises to form a coating of about one-half inch thickness within about 7 seconds±2 seconds and will be tack free within 15 seconds±2 seconds. The foam which is produced has a density in the neighborhood of 2 pounds per cubic foot and has a characteristic property of the lowest density being adjacent to the pipe with a gradual increase in density out to the skin.

EXAMPLE 2

To produce a two component self-extinguishing one-shot rigid urethane foam the following two components were fed into a mixing head at the same rate as indicated in Example 1.

| Component A: | Parts by weight |
|---|---|
| Polyol—LK 380 (produced by Union Carbide Chemicals Co.) | 60 |
| Additive ET 607 (produced by Dow Chemical Co.) | 20 |
| Additive Vircal 82 (produced by Virginia-Carolina Chemicals) | 20 |
| Catalyst—tetra-methyl butanediamine | 1.0 |
| Catalyst—dibutyl tin dilaurate | 0.5 |
| Silicone surfactant | 2.0 |
| Trichlorofluoromethane | 36.0 |

| Component B: | |
|---|---|
| "Crude," polyphenyl isocyanate | 85.0 |

Component A is maintained at a temperature of 70° F. and Component B is maintained at a temperature of 110° F. The temperature of the pipe 1 is maintained at 120° F.±10°. With this formulation, the cream time of the resulting mixture is in the neighborhood of 3 seconds±1 second and the time required for the foam to rise is 10 seconds±1 second. At the end of 20 seconds±2 seconds the foam is tack free. This material has an overall foam density of about 2.5 pounds per cubic foot±²⁄₁₀ pound per cubic foot. This foam is self-extinguishing in relation to combustion and has a fairly uniform density profile.

EXAMPLE 3

To prepare a two component rigid urethane foam, the following components were fed into a mixing head at a total flow rate of 857 grams per minute.

Component A: Parts by weight
Polyol—Poly G 435 DM (produced by Olin-
Mathieson Chemicals) _____ 100.0
Blowing agent—trichlorofluoromethane ____ 35.0
Silicone surfactant _____ 1.5
Catalyst—DABCO (produced by Houdry
Process Co.) _____ 1.0

Component B:
Quasi—prepolymer (TDI—75.2% by wt. Poly
G 435 DM 24.8%) _____ 130.0

In this example, the temperature of Component A is maintained at about 65° F. and the temperature of Component B is maintained at a temperature of 90° F. The temperature of the pipe 1 is maintained at a temperature of about 50° F. Under these conditions, the cream time of the mixture is 1.5 seconds±5/10 and the material will rise completely within 5 seconds±2 seconds. This material is tack free within 10 seconds±2 seconds and has overall foam density of about 2.5 pounds per cubic foot. The foam characteristics of the material of this example are a uniform density. By decreasing the lineal speed of the substrate to fifty feet per minute, an insulated covering having a radial thickness of one inch is produced.

EXAMPLE 4

In this example a one-shot flexible urethane foam insulation is prepared by mixing the following components in a mixing head.

Component A: Parts by weight
Polyol—LG 56 (produced by Union Carbide
Chemicals) _____ 100.0
Water _____ 3.6
Silicone surfactant _____ 2.0
Catalyst—DABCO (produced by Houdry
Process Co.) _____ 0.3

Component B:
Refined tolylene di-isocyanate 80/20 blend __ 45.0

Component C:
Stannous octoate plus diluent _____ 0.5

The temperature of all the components are maintained at about 70° F. while the temperature of the pipe 1 is maintained at a temperature of 150° F. ±10°. Under these conditions, the cream time of the resulting mixture is 2 seconds±1 second, the rise time is 10 seconds±2 seconds, and the material will be tack free within 90 seconds ±9 seconds. The overall foam density of the resulting insulation is 2.2 pounds per cubic foot±2/10 pound per cubic foot. The material has the characteristic property of flexibility, open cell insulation, and smooth outer skin. The density profile indicates a lower density adjacent to the substrate and a higher density adjacent to the skin.

I claim:
1. A method of coating an elongated member with a foam of polyurethane which comprises the steps of:
(1) moving the elongated member vertically and upwardly at a uniform rate through a dispensing zone which conforms with the geometric dimensions of the periphery of the member;
(2) applying a foamable fluid comprising a mixture of an organic compound bearing hydroxyl groups and an organic compound containing reactive isocyanate groups as a liquid at a uniform flow rate and at a low pressure onto the surface of said elongated member to thoroughly wet said surface;
(3) sealing the area below the dispensing zone through rubbing contact with the elonagted member to prevent the foamable mixture from flowing downwardly;
(4) thereatfer foaming and curing the foam on the elongated member.

2. A method of coating an elongated member with a foam of polyurethane which comprises the steps of:
(1) moving the elongated member vertically and upwardly through a dispensing zone which conforms with the geometric dimensions of the surface of the member;
(2) applying a flow of a liquid foamable mixture of reactive polyurethane forming chemicals at a uniform flow rate and at a low pressure onto the surface of said elongated member to thoroughly wet said surface;
(3) correlating the temperature of the surface of the elongated member and the temperature of the chemicals with the chemical formulation and flow rate of the mixture of reactive polyurethane forming chemicals to produce a foamed coating of uniform thickness;
(4) foaming said mixture and curing said foam on the elongated member.

3. A method of coating an elongated member with a foam of polyurethane which comprises the steps of:
(1) moving the elongated member vertically with respect to gravity at a uniform lineal speed through a dispensing zone which conforms with the geometric dimensions of the surface of the member;
(2) supplying a flow of a liquid foamable mixture of reactive polyurethane forming chemicals at a uniform flow rate and at a low pressure onto the surface of said elongated member to thoroughly wet said surface;
(3) correlating the temperature of the surface of the elongated member, the lineal speed of the elongated member, the temperature of the chemicals, the chemical formulation and the flow rate of the mixture of reactive polyurethane forming chemicals to produce a foamed coating of pre-determined physical characteristics and of uniform thickness; and
(4) foaming said mixture and curing said foam on the elongated member.

4. A method of coating an elongated member with a foam of polyurethane which comprises the steps of:
(1) moving the elongated member vertically with respect to gravity through a dispensing zone which conforms with the geometric dimensions of the surface of the member;
(2) applying a flow of a liquid foamable mixture of reactive polyurethane forming chemicals at a uniform flow rate and at a low pressure onto the surface of said elongated member to uniformly wet the surface of said member;
(a) said mixture of reactive polyurethane forming chemicals comprising a mixture of an organic compound bearing hydroxyl groups, an organic compound containing reactive isocyanate groups and a catalyst to produce a mixture having a pot life in the range of from 1/10 of a second to 15 minutes;
(3) maintaining the temperature of the surface of the portion of said elongated member which is in proximity to the dispensing zone essentially constant as it comes into contact with said mixture of reactive polyurethane forming chemicals;
(4) maintaining the lineal speed of said elongated member essentially constant;
(5) foaming said mixture and curing said foam on the elongated member.

5. A method of coating an elongated member with a foam of polyurethane which comprises the steps of:
(1) moving an elongated member vertically with respect to gravity at a uniform lineal speed through a series of zones wherein
(a) the temperature of the surface of said elongated member is brought within a specified range;

(b) a mixture of reactive polyurethane forming chemicals is applied in the liquid phase at low pressure to the surface of said elongated member to uniformly wet the surface thereof; and (c) a mixture of polyurethane forming chemicals is thereafter foamed in place on the surface of said elongated member and cured to form a foamed coating of uniform thickness.

6. A method of coating a metal tube with a foam of polyurethane which comprises the steps of:

(1) moving a metal tube vertically with respect to gravity at a uniform lineal speed through a series of zones wherein (a) a degreasing agent is applied to said metal tube to remove grease therefrom;

(b) the temperature of the surface of said metal tube is brought within a specified range;

(c) a mixture of reactive polyurethane forming chemicals is applied in the liquid phase at low pressure to the surface of said tube to uniformly wet the surface thereof; and (d) the mixture of polyurethane forming chemicals is thereafter foamed in place on the surface of said tube and cured to form a foamed coating of uniform thickness.

References Cited

UNITED STATES PATENTS

| | | | |
|---|---|---|---|
| 2,332,538 | 10/1943 | Smith | 264—174 |
| 3,054,142 | 9/1962 | Henderer et al. | 18—13 X |
| 3,068,532 | 12/1962 | Higgins | 264—47 |
| 3,170,968 | 2/1965 | Rokunohe et al. | 264—271 X |
| 3,206,802 | 9/1965 | Van Riper | 18—13 |
| 3,208,868 | 9/1965 | Strobel et al. | 117—94 X |
| 3,079,641 | 3/1963 | Knox et al. | |

OTHER REFERENCES

Dombrow, B.A., Polyurethanes, Reinhold Publishing Corporation New York, 1957 (pp. 19–21, 36, 87 and 135 relied on).

Knox, R. E. Post-Forming of Polyurethane Foam, Foam Bulletin, Du Pont Elastomers Laboratory, Wilmington, Del., Dec. 7, 1960.

Modern Plastics, March 1962 issue, p. 106 et seq.

ALFRED L. LEAVITT, *Primary Examiner.*

A. GRIMALDI, *Assistant Examiner.*

U.S. Cl. X.R.

18—13; 117—128.4; 138—145; 264—47, 174